United States Patent [19] [11] 4,093,313
Burckhardt [45] June 6, 1978

[54] TWO-CIRCUIT BRAKE SYSTEM FOR MOTOR VEHICLES

[75] Inventor: Manfred H. Burckhardt, Waiblingen, Germany

[73] Assignee: Daimler-Benz Aktiengesellschaft, Stuttgart, Germany

[21] Appl. No.: 804,743

[22] Filed: June 8, 1977

[30] Foreign Application Priority Data

June 9, 1976 Germany ............................ 2625713

[51] Int. Cl.² .......................... B60T 8/04; B60T 8/18
[52] U.S. Cl. ...................................... 303/6 C; 60/562;
188/345; 188/349; 303/22 R; 303/100
[58] Field of Search ............. 303/100, 6 R, 6 C, 22 R, 303/84 A; 188/345, 349; 60/561, 562

[56] References Cited

U.S. PATENT DOCUMENTS

| 3,800,538 | 4/1974 | Jones | 188/345 |
| 3,825,308 | 7/1974 | Kasselmann | 303/100 |
| 3,950,037 | 4/1976 | Pembleton | 188/349 |

Primary Examiner—Trygve M. Blix
Assistant Examiner—Reinhard J. Eisenzopf
Attorney, Agent, or Firm—Craig & Antonelli

[57] ABSTRACT

A two-circuit brake system for motor vehicles with a shiftable master brake cylinder which includes two pressure spaces for the two brake circuits, of which the pressure space for the front axle brake circuit has a larger cross section than the pressure space for the rear axle brake circuit and which are connected with each other by a line extending externally of the master brake cylinder, whereby a shifting valve operating in dependence on the vehicle load is arranged in this line which is able to establish and interrupt the connection between the two pressure spaces; an intermediate piston is arranged between the two pressure spaces in the master brake cylinder coaxial to the two pressure pistons, which is freely movable within a guide sleeve of smaller diameter and is provided with central extensions on both sides thereof for the mechanical cooperation with the two pressure pistons; the shifting valve is thereby adapted to be shifted as a function of the load, of the pressure prevailing in the brake cylinder and of the deceleration attainable with this pressure.

10 Claims, 3 Drawing Figures

TWO-CIRCUIT BRAKE SYSTEM FOR MOTOR VEHICLES

The present invention relates to a two-circuit brake installation for motor vehicles with a shiftable master brake cylinder that includes two pressure spaces for the two brake circuits, of which the pressure space for the front axle brake circuit may have a larger cross section than that for the rear axle brake circuit and which are connected with each other by way of a line extending outside of the master brake cylinder, in which a shifting valve operable in dependence on the vehicle load is arranged which is able to establish and to interrupt the connection between the two pressure spaces, between which an intermediate piston is arranged in the master brake cylinder coaxial to the two pressure pistons, which is freely movable in a guide sleeve of smaller diameter and is provided on both sides with central extensions for the mechanical cooperation with the two pressure pistons.

A master brake cylinder for such a two-circuit brake installation is described in the German Patent application P No. 25 04 699.5. With such a master brake cylinder, its control can be carried out both by the vehicle load as also by the slippage difference of the wheels. In both cases, an interengagement at the vehicle is necessary. In the former case, a load switch has to be installed, whose shifting point is dependent on the condition of the spring system. If, for example, the springs settle which compared to new springs always happens, then the shifting point changes, and more particularly in a direction unfavorable for the braking stability of the vehicle. In the second case, the installation of velocity sensors at the wheels is necessary as is also a costly cable connection which is not unproblematical.

It is the aim of the present invention to provide a control which does not require a significant interengagement into the vehicle and which is independent of the respective service condition of the vehicle.

As solution to the underlying problems, the following considerations were made.

Certain principles are the basis for the shifting operation which relate to a comparison of the ideal and installed brake force distribution with an empty and with a loaded vehicle, whereby it is considered that the installed brake force distribution lies underneath the parabola for the ideal brake force distribution.

A stable behavior of a vehicle during the braking occurs, when the front axle blocks prior to the rear axle. Such a behavior is attained if the installed brake force distribution lies underneath the respective parabola of the ideal brake force distribution. The empty vehicle is stable only up to a point which results as the point of intersection of the installed brake force distribution with the parabola of the ideal brake force distribution of the empty vehicle. With greater braking, the rear axle may break out.

With the present, customary road surfaces and tires, a stability is required and made possible only up to a specific brake force of $a = 0.9$. Higher braking actions are practically not realizable anyhow.

On the basis of these considerations, the task thus results to carry out the shifting in dependence on the load of the vehicle and to provide a simple installation independent of the service condition of the vehicle. The underlying problems are solved according to the present invention in that the shifting valve is shifting in dependence on the load, in dependence on the pressure prevailing in the brake cylinder and in dependence on the deceleration attainable with this pressure. In practice this requirement is so realized that the initially open shifting valve is shifted and therewith the connection between the two pressure spaces is interrupted, when below a predetermined pressure a predetermined deceleration is exceeded. Consequently, the pressure spaces are again separated from one another by the shifting of the shifting valve and therewith different pressures are produced in the two brake circuits by reason of the different cross sections thereof.

In order to obtain this effect, a pressure-dependent switch, a deceleration switch, a double-circuit contact relay and a solenoid switch are series-connected in a shifting circuit, which energizes the solenoid switch within the given pressure and velocity range, whereby the solenoid switch closes the associated solenoid valve and therewith the connection between the two pressure spaces, which still remains closed by the double contact relay also when the pressure of the pressure switch has left again its switching range, as long as only the deceleration switch remains engaged by the still existing magnitude of the deceleration. For example, with a certain vehicle type, the pressure switch may be closed up to a pressure of 40 atmospheres excess pressure (atm) and the deceleration switch may be closed at a deceleration above 5 m/sec$^2$. As to the rest, it has been determined by tests that the brake pressure with an empty vehicle amounts to approximately 35 atm in the aforementioned position for producing the braking. In order to take into consideration this value, a pressure switch may be used in this vehicle, which closes at 35 atm and again opens at 40 atm. Consequently, the pressure switch is closed within a range between 35 and 40 atm and above as well as below this range is opened when the deceleration switch is closed above 5 m/sec$^2$.

Accordingly, it is an object of the present invention to provide a two circuit brake installation for motor vehicles which avoids by simple means the aforementioned shortcomings and drawbacks encountered in the prior art.

Another object of the present invention resides in a two-circuit brake system for motor vehicles which is simple in construction, yet is highly effective and reliable in operation.

A further object of the present invention resides in a two-circuit brake installation for motor vehicles which obviates an interengagement at the vehicle to control the system.

Still a further object of the present invention resides in a two circuit brake system which dispenses with costly cables and the installation of velocity sensors.

Still another object of the present invention resides in a two-circuit brake system which is substantially independent of the respective service condition of the vehicle.

These and other objects, features and advantages of the present invention will become more apparent from the following description when taken in connection with the accompanying drawing which shows, for purposes of illustration only, one embodiment in accordance with the present invention, and wherein.

Figure 1:
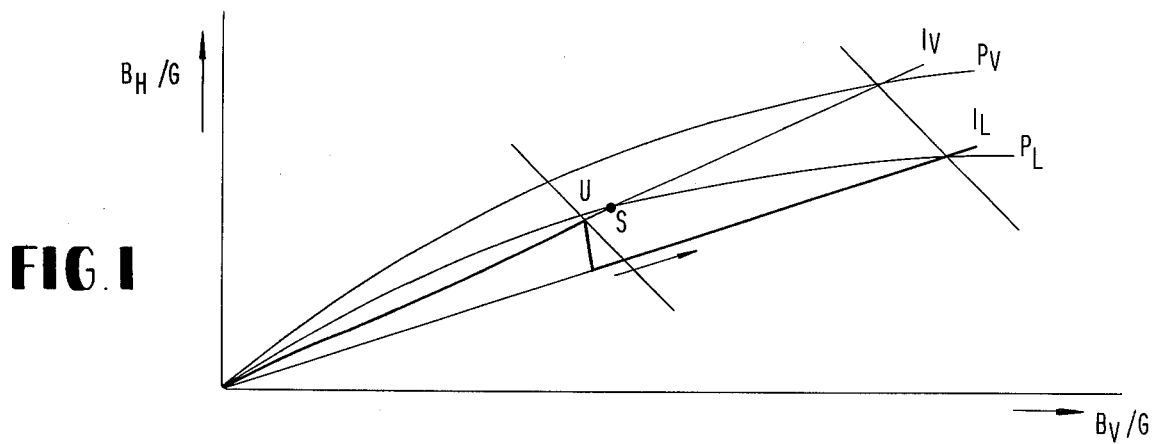
FIG. 1 is a diagram illustrating the parabolae of the "ideal" brake force distribution of the empty as well as of the fully loaded vehicle and additionally the "installed" brake force distribution of the shiftable master brake cylinder in the shifting positions with a fully loaded and empty vehicle.

Referring now to the drawing wherein like reference numerals are used throughout the various views to designate like parts, FIG. 1 serves for the explanation of the problems of the present invention and for the derivation of the shifting principle used in connection therewith. The "ideal" brake force distribution of the empty vehicle is illustrated in FIG. 1 and is designated therein by $P_L$. Furthermore, the "ideal" brake force distribution of the fully loaded vehicle is illustrated in this figure and designated therein by $P_V$. The lines which can additionally be found in this drawing indicate the "installed" brake force distribution, whereby the line $I_V$ indicates this brake force distribution of the shiftable master brake cylinder in the shifting position which is to be assumed with a fully loaded vehicle, whereas the line $I_L$ indicates the corresponding brake force distribution in the shifting position which is to be assumed with an empty vehicle.

Reference character S represents the point of intersection of the installed brake force distribution $I_V$ in the shifting position with a fully loaded vehicle with the parabola of the ideal brake force distribution with an empty vehicle.

In the following, additionally the reference character $a$ indicates the braking of the vehicle, namely, the deceleration divided by the acceleration due to gravity.

The brake forces at the front axle and at the rear axle, each measured at the wheel circumference, are designated by $B_V$ and $B_H$.

G represents the vehicle and U the shifting point from the shifting position "fully-loaded" to the shifting position "empty."

A stable behavior of the vehicle during the braking, namely, a blocking of the front axle prior to the rear axle is achieved if the installed brake force distribution lies underneath the respective parabola of the ideal brake force distribution. The empty vehicle is therefore stable only up to the point S in the first position in which the shifting valve is open for the fully loaded condition of the vehicle. With stronger braking action, the rear axle may break out in this shifting position.

For purposes of explanation, it should also be pointed out that with the present-day customary road surfaces and the presently used tires, a stability only up to about $a = 0.9$ is required and as to the rest, stronger braking actions are not realizable in practice at all under these circumstances.

A balanced or even behavior of the vehicle is achieved if during the braking with a slight force at first the first position contemplated for the fully loaded vehicle is engaged independently of the load condition, in which the shifting valve 14 (FIG. 2) keeps open the connection between the two pressure spaces 16 and 17 (FIG. 3) located in the master brake cylinder 15. The rear axle is thus used far-reachingly for the braking and, as a result thereof, an evening out of the wear at the front and rear axle is attained.

This is true with an empty vehicle up to the shifting point U (FIG. 1), which should lie slightly below point S. For purposes of avoiding an instability, it is necessary in this point to shift into the second position of the shifting valve 14, i.e., it is being closed by the energization of the associated magnet 13. As a result thereof, the connecting lines 18a, 18b between the two pressure spaces 16 and 17 are closed.

A pressure switch 1, a deceleration switch 5, and a double contact relay 8 of conventional construction are required for the actuation of the solenoid valve 13, 14. This switch 1 responding to pressure includes three contact positions 2, 3 and 4. The pressure switch 1 assumes the contact position 2 when the pressure P acting on the same lies below 35 atm. At a pressure of 35 atm, the pressure switch 1 jumps from contact 2 to contact 3. If the pressure P continues to increase, then the contact tongue 19 jumps from the contact point 3 to the contact point 4 when the pressure has reached 40 atm.

The deceleration switch has two contact points 6 and 7. Customarily, the contact tongue 20 of the deceleration switch 5 rests on the contact point 6. Only during a braking of $a = 0.5$, the contact tongue 20 jumps from the contact point 6 to the contact point 7.

The double contact relay 8 includes a solenoid 21 which upon energization permits the two contact tongues 22 to jump from the contact points 9 and 11 to the contact points 10 and 12. As a result thereof, the double contact relay 8 holds itself in the energized position as long as the contact tongue 20 still rests on the contact point 7, regardless of the contact position 2 to 4 on which the contact tongue 19 rests.

With a closed shifting valve 14 and thus with a separation of the two line branches 18a and 18b from one another, the rear axle partakes to a lesser extent in the braking. However, the vehicle remains stable up to the desired braking of about $a = 0.9$.

If the vehicle is fully loaded, then a shifting would represent an unnecessary lengthening of the braking path or distance since brake stability is assured also in the first position of the shifting valve.

The following relation applies, as known, for the braking $a$.

$$a = (B_{VA}/B) + (B_{HA}/G) = (B_{VA}/G)(1 + v) \quad (1)$$

whereby $$v = (B_{HA}/B_{VA}) \quad (2)$$

The brake forces at the axles are as follows:

$$B_{VA} = 4 \cdot (F \cdot r_m/r_w)_{VA} \cdot P_{VA} \cdot \mu_{VA} \quad (3)$$

$$B_{HA} = 4 \cdot (F \cdot r_m/r_w)_{HA} \cdot P_{HA} \cdot \mu_{HA} \quad (4)$$

whereby
F is the piston area (of one piston)
$r_m$ is the effective average radius of the brake disk
$r_w$ is the effective roll radius of the wheel
p is the brake pressure
μ is the friction coefficient of the lining.
The suffixes used in the aforementioned equations represent:
VA front axle
HA rear axle
$B_V$, $B_H$ the brake force at the front axle and at the rear axle (measured in the wheel circumference)
G the vehicle weight U the shifting point from the first position into the second position $p_{VAU_1}$ the pressure at the front axle in the first position of the shifting point.

The first term of the equation is purely constructive and always constant for a given vehicle.

Within the scope of the instant consideration, the ratio of the coefficients of friction may also be considered as constant.

The ratio of the pressures is practically constant for a shifting condition of the master brake cylinder.

Consequently, the equation (1) may be written as follows:

$$a = (1/G) \cdot 4 \cdot (F \cdot r_m)_{VA} \cdot p_{VA} \cdot \mu_{VA} \cdot (1 + v_i) \qquad (5)$$

with $i = 1$ starting condition of the HBZ (position 1)
$i = 2$ shifting condition of the HBZ (position 2)
As a first approximation, the following is true $$4 \cdot (F \cdot r_m/r_w)_{VA} \cdot \mu_{VA} = \text{const} = K \qquad (6)$$

so that it is possible to write equation (5):

$$a = p_{VA}/G \cdot K(1 + v_i) \qquad (7)$$

This means that the braking $a$ is proportional to the brake pressure of the front axle and inversely proportional to the weight. A clear coordination can be determined therewith for the braking at the shifting point $a_U$.

It will be determined by tests with the empty vehicle—that means that the vehicle has been tanked ready for driving and includes a driver—whose weight is known, which brake pressure $p_{VAU_1}$ is required in the first position in order to produce the braking $a_U$.

The shifting specification now requires the following:

If with a brake pressure $p_{VA}$ which is smaller than or equal to $p_{VAU_1}$ a braking is obtained which is equal to larger than $a_U$, then the entire weight of the vehicle is so slight that with stronger decelerations, an overbraking of the rear axle has to be feared. Consequently, the master brake cylinder has to be shifted.

If the brake pressure $p_{VA}$ which is necessary for producing the braking $a_U$ is considerably larger than $p_{VAU_1}$, then the entire weight of the vehicle is so large that an overbraking of the rear axle need not be feared. Consequently, the master brake cylinder should not be shifted.

Figure 2:
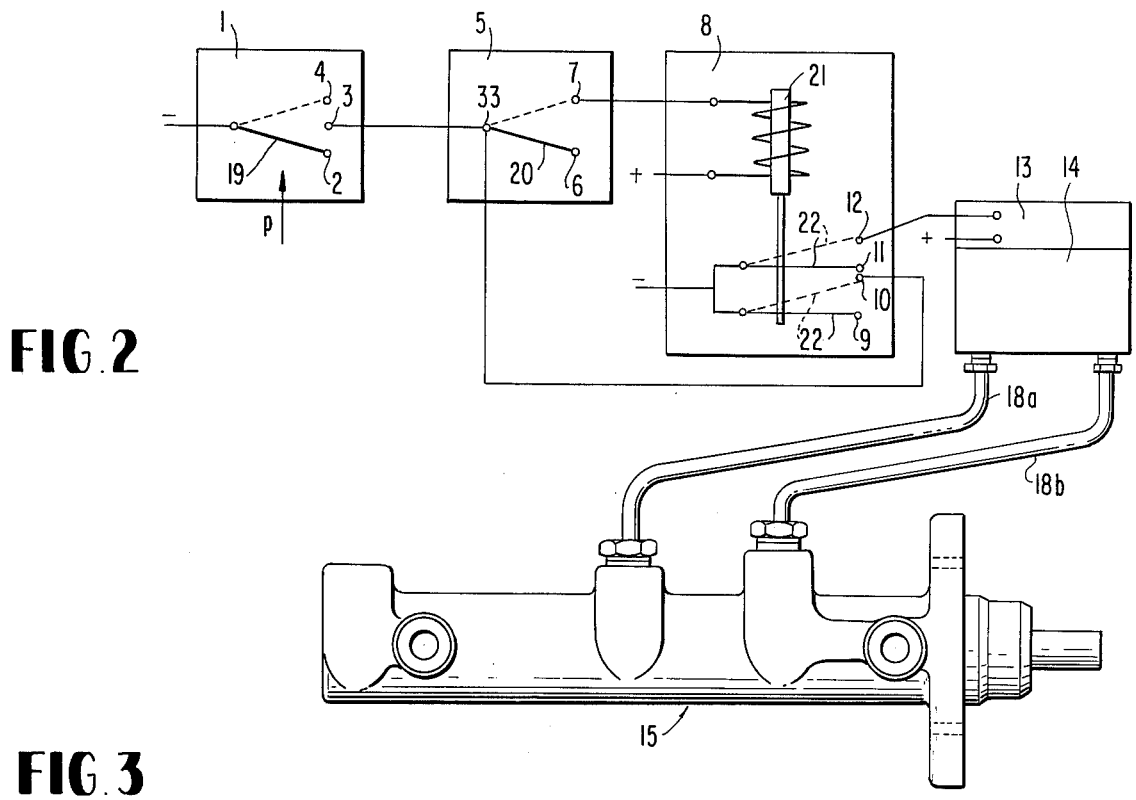
FIG. 2 is a schematic view of a two-circuit brake system in accordance with the present invention which schematically illustrates the switches necessary for the present invention in conjunction with a shifting valve for the master brake cylinder.
Figure 3:
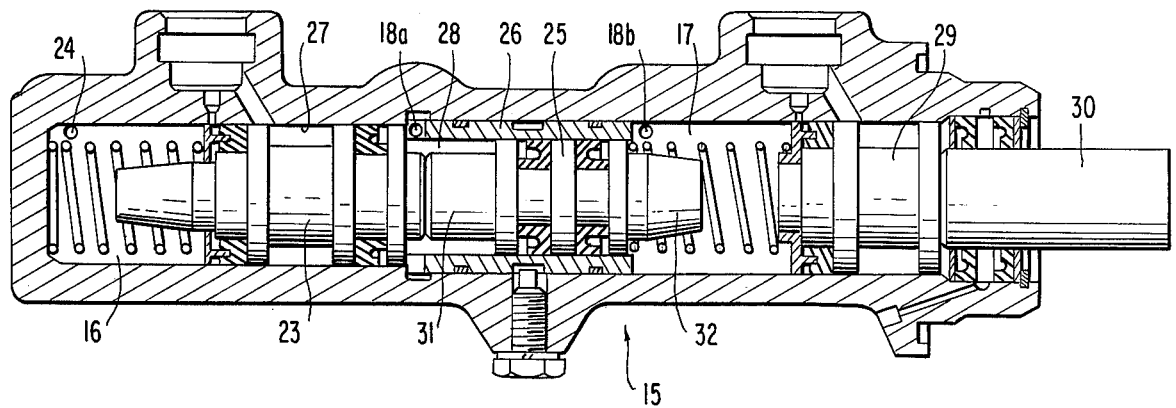
FIG. 3 is a longitudinal cross-sectional view through a master brake cylinder in accordance with the present invention.

The practical realization of the calculated shifting principles can be carried out by means of an arrangement which is illustrated in FIG. 2.

It is assumed that by the aforementioned tests it has been determined, for example, that the brake pressure with an empty vehicle in the first position amounts to about 35 atm for producing the braking $h_U (p_{VAU_1})$. A pressure switch 1 can then be used which closes at 35 atm and which opens again at 40 atm. However, a pressure switch 1 may be used which is initially open, closes at 35 atm and again opens at 40 atm. During these operations, the shifting tongue 19 jumps from the contact position 2 to the contact position 3 upon reaching 35 atm and as a result thereof establishes an electrical connection from ground by way of the pressure switch 1 to the deceleration switch 5. The deceleration switch 5 is closed above the braking $a = 0.5$ (corresponding approximately to 5 m/sec²). This means the contact tongue 20 jumps upon reaching $a = 0.5$ from the contact point 6 to the contact point 7 and as a result thereof establishes a connection between the contact position 3 of the pressure switch 1 and the magnet 21 of the double contact relay 8.

During the braking of the vehicle, a deceleration results immediately. If the deceleration is equal to $a_U$ or larger than this braking, then the deceleration switch 5 closes, i.e., the contact tongue 20 establishes a connection between the contact point 33 by way of the contact point 7 with the magnet 21 of the double contact relay point 8. If at such an instant the pressure switch 1 has already reached its lower closing limit, i.e., the brake pressure already amounts to 35 atm so that the contact tongue 19 rests on the contact position 3, then a current flows by way of the contacts 3 and 7 to the relay 8. The relay 8 is energized and closes the contacts 10 and 12. As a result thereof the relay is self-holding, also when the contact 3 opens and the contact tongue 19 changes over to the contact position 4, i.e., if a pressure of 40 atm or thereabove is reached in the pressure switch 1. This would be synonymous with a stronger brake actuation. This is so as the relay 8 drops off or becomes de-energized again only when the deceleration switch 5 opens, i.e., when the braking is smaller than $a_U$. The magnet 13 is controlled by way of the contact 12 which shifts the shifting valve 14. If the magnet 13 is energized, the shifting valve 14 is closed, i.e., the pressure spaces 16 and 17 are again separated from one another.

In this condition, a smaller pressure is supplied to the rear axle brake circuit than to the front axle brake circuit. This effect is realized by the special construction of the master cylinder which will be explained by reference to FIG. 3.

A floating piston 23 (FIG. 3) is disposed in the housing of the master brake cylinder generally designated by reference numeral 15, which delimits the pressure space 16, from which branches off the line 24 to the rear axle brakes. An intermediate piston 25 is disposed in a sleeve 26 which has a smaller inner diameter than the housing bore 27 receiving the floating piston 23. The intermediate piston 25 is freely movable in the sleeve 26, which in its turn is fixedly inserted into the housing 15. A space 28 is disposed between the floating piston 23 and the intermediate piston 25, which is connected by a connecting line 18a and 18b (see FIG. 2) with the pressure space 17 for the front axle brakes by way of the solenoid valve 13, 14. This pressure space 17 is closed off by the pressure rod piston 29 which is actuated by means of the pressure rod 30 either directly from the brake pedal or from a brake booster. The intermediate piston 25 has concentric extensions 31 and 32 on both sides thereof for the cooperation with the floating piston 23, on the one hand, and the pressure rod piston 29, on the other, for the case that a brake circuit may fail.

If the solenoid valve 14 is closed, the part 18b of the connecting line is connected with the front axle brakes. If the pressure rod 30 is now actuated, then a pressure is being built up in the pressure space 17, that acts directly on the front axle brakes by way of the line 18b. However, the intermediate piston 25 is displaced by this pressure toward the left and the intermediate piston 25 takes along by means of its central extension 31 the floating piston 23. Consequently, a pressure is being built up in the pressure space 16 which corresponding to the area ratio between the floating piston 23 and the intermediate piston 25 is smaller than the pressure in the space 17. This smaller pressure is conducted to the rear axle brakes by way of the connection 24.

If, in constradistinction thereto the solenoid valve 13, 14 is opened, then the two line parts 18a and 18b are connected with each other. The pressure acting from the space 17 on the front axle brakes now continues therefore also directly into the space 28 and—since the floating piston 23 cannot absorb any forces—into the pressure space 16. Consequently, the same pressure then acts on the rear axle brakes as on the front axle brakes.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A two-circuit brake installation for motor vehicles, comprising a shiftable master brake cylinder means including two pressure space means for the two brake circuits, said two pressure space means being connected with each other by a line extending outside of the master brake cylinder means, a shifting valve means arranged in said line which is operable in dependence on the vehicle load to establish and interrupt the connection between the two pressure space means, and an intermediate piston in the master brake cylinder means between said two pressure space means, said intermediate piston being arranged substantially coaxially to two pressure points and being freely movable within a guide sleeve means of smaller diameter, said intermediate piston being provided on both sides thereof with central extensions for the mechanical cooperation with the two pressure pistons, characterized by control means for shifting the shifting valve means in dependence on the load, on the pressure prevailing in the master brake cylinder means and on the deceleration attainable with such pressure.

2. A two-circuit brake installation according to claim 1, characterized in that the pressure space means for the front axle brake circuit has effectively a larger cross section than the pressure space means for the rear axle brake circuit.

3. A two-circuit brake installation according to claim 1, whereby the ratio of the cross-sectional areas of the intermediate piston and of the rear axle pressure piston corresponds to the desired pressure ratio with an empty vehicle, characterized in that the initially open shifting valve means is shifted and therewith the connection between the two pressure space means is interrupted, when a predetermined deceleration is exceeded below a predetermined pressure.

4. A two-circuit brake installation according to claim 3, characterized by a control circuit including a pressure switch means, a deceleration switch means, a double-circuit contact relay means and a solenoid switch means series-connected in said circuit, which are operable to energize the solenoid switch means within the given pressure and velocity range, a solenoid valve means associated with said solenoid switch means, the solenoid switch means, upon energization thereof, closing the solenoid valve means and therewith the connection to the two pressure space means, said solenoid valve means remaining closed by the double contact relay means forming a self-holding means when the pressure of the pressure switch means has again left its switching range, as long as only the deceleration switch means is still actuated by the existing magnitude of the deceleration.

5. A two-circuit brake installation according to claim 4, characterized in that the pressure switch means is closed up to a pressure of about 40 atm and the deceleration switch means is closed at a deceleration above 5 m/sec$^2$.

6. A two-circuit brake installation according to claim 4, characterized in that the pressure switch means is closed within a range between about 35 and about 40 atm and is open above and below this range, and the deceleration switch means is closed above about 5 m/sec$^2$.

7. A two-circuit brake installation according to claim 4, characterized in that the pressure space means for the front axle brake circuit has effectively a larger cross section than the pressure space means for the rear axle brake circuit.

8. A two-circuit brake installation according to claim 1, characterized by a control circuit including a pressure switch means, a deceleration switch means, a double-circuit contact relay means and a solenoid switch means series-connected in said circuit, which are operable to energize the solenoid switch means within the given pressure and velocity range, a solenoid valve means associated with said solenoid switch means, the solenoid switch means, upon energization thereof, closing the solenoid valve means and therewith the connection to the two pressure space means, said solenoid valve means remaining closed by the double contact relay means forming a self-holding means when the pressure of the pressure switch means has again left its switching range, as long as only the deceleration switch means is still actuated by the existing magnitude of the deceleration.

9. A two-circuit brake installation according to claim 8, characterized in that the pressure switch means is closed up to a pressure of about 40 atm and the deceleration switch means is closed at a deceleration above 5 m/sec$^2$.

10. A two-circuit brake installation according to claim 8, characterized in that the pressure switch means is closed within a range between about 35 and about 40 atm and is open above and below this range, and the deceleration switch means is closed above about 5 m/sec$^2$.

* * * * *